United States Patent
Faibish et al.

(10) Patent No.: US 10,776,028 B2
(45) Date of Patent: Sep. 15, 2020

(54) METHOD FOR MAXIMUM DATA REDUCTION COMBINING COMPRESSION WITH DEDUPLICATION IN STORAGE ARRAYS

(71) Applicant: EMC IP Holding Company LLC, Hopkinton, MA (US)

(72) Inventors: Sorin Faibish, Newton, MA (US); Rustem Rafikov, Hopkinton, MA (US); Philippe Armangau, Acton, MA (US)

(73) Assignee: EMC IP HOLDING COMPANY LLC, Hopkinton, MA (US)

(*) Notice: Subject to any disclaimer, the term of this patent is extended or adjusted under 35 U.S.C. 154(b) by 157 days.

(21) Appl. No.: 16/031,910

(22) Filed: Jul. 10, 2018

(65) Prior Publication Data

US 2020/0019329 A1     Jan. 16, 2020

(51) Int. Cl.
  *G06F 7/00* (2006.01)
  *G06F 3/06* (2006.01)
  *G06F 12/0864* (2016.01)
  *G06F 12/0804* (2016.01)

(52) U.S. Cl.
  CPC .......... *G06F 3/0641* (2013.01); *G06F 3/0608* (2013.01); *G06F 3/0619* (2013.01); *G06F 3/0683* (2013.01); *G06F 12/0804* (2013.01); *G06F 12/0864* (2013.01); *G06F 2212/401* (2013.01)

(58) Field of Classification Search
  CPC .... G06F 3/0641; G06F 3/0608; G06F 3/0619; G06F 3/0683; G06F 12/0804; G06F 12/0864
  USPC ................................................. 707/600–899
  See application file for complete search history.

(56) References Cited

U.S. PATENT DOCUMENTS 9,740,631 B2* 8/2017 Shiu ...................... G06F 3/0604

* cited by examiner

*Primary Examiner* — Isaac M Woo
(74) *Attorney, Agent, or Firm* — Workman Nydegger (57) ABSTRACT

One example method includes storing a user application input/output operation (IO) in a compression cache portion of a cache memory wherein the user application IO is associated with a data block, compressing the data block to produce a compressed data block, hashing the compressed data block to create a hash that uniquely corresponds to the data block, and storing the hash in a deduplication digest portion of a cache memory, wherein the deduplication digest portion includes a plurality of groups, each of which corresponds to a particular extent to which a data block is compressible. When a compressibility of the data block exceeds a threshold, the data block is retained in the compression cache portion, and when the compressibility of the data block does not exceed the threshold, the data block is flushed from the compression cache portion to disk.

20 Claims, 4 Drawing Sheets

METHOD FOR MAXIMUM DATA
REDUCTION COMBINING COMPRESSION
WITH DEDUPLICATION IN STORAGE
ARRAYS

FIELD OF THE INVENTION

Embodiments of the present invention generally relate to data storage. More particularly, at least some embodiments of the invention relate to systems, hardware, software, computer-readable media, and methods directed to reducing an amount of data that is to be stored. The amount of storage space needed for the data is correspondingly reduced as well. In example embodiments, the reduction in data is achieved through an optimized combination of data compression and data deduplication. The data compression and/or data deduplication may be performed inline as data is being stored, or may be performed off-line, post-processing, or as background operations.

BACKGROUND

The new generation of storage arrays are moving from the use of Hard Disk Drive (HDD) storage media to the use of Solid State Drive (SSD) storage media and nonvolatile memory such as Nonvolatile Memory Express (NVMe) flash backend devices. Because SSD devices can be as much as 20 times more expensive than HDD storage media, there is a market incentive to reduce to a minimum the footprint of data on the flash media, that is, the NVM devices.

A reduction in the size of the dataset that is ultimately stored may be achieved by data reduction methods such as data compression or data deduplication. Data compression and data deduplication are fundamentally different processes and, as such, are generally best suited for different respective types of workloads. As well, the extent to which a dataset footprint can be reduced by one or the other of these techniques depends at least in part on the structure of the data sets.

Moreover, while some reduction of the memory footprint may be achieved with compression and deduplication, such techniques are uncorrelated with each other, and their combined implementation would likely result in a lower data footprint reduction and/or poor storage input/output operations per second (IOPS) and higher latency or rate of transfer (RT) performance. This also represents a problem for the customers who expect much higher performance from their much more expensive flash based storage arrays. As such, there is a conflict between the data reduction expectation and the performance of flash based storage arrays according to the higher IOPS performance of flash as compared to HDD moving media.

Thus, conventional dataset footprint reduction scenarios typically involve one or the other of data compression or data deduplication, but not both. As such, conventional approaches to reducing the size of a dataset footprint have proven inadequate at least because they fail to take advantage of the relative strengths of both techniques. Moreover, even if the data compression and data deduplication techniques were to be combined somehow, various problems are likely to occur as a result.

BRIEF DESCRIPTION OF THE DRAWINGS

In order to describe the manner in which at least some of the advantages and features of the invention can be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Embodiments of the present invention generally relate to data storage. More particularly, at least some embodiments of the invention relate to systems, hardware, software, computer-readable media, and methods directed to reducing an amount of data that is to be stored. The amount of storage space needed for the data is correspondingly reduced as well. This storage space requirement may be referred herein as a dataset footprint. In example embodiments, the reduction in data is achieved through an optimized combination of data compression and data deduplication. The data compression and/or data deduplication may be performed off-line, post-processing, or as background operations.

In general, the data reduction achieved with deduplication depends on the amount of memory available for the dedupe digest index cache, at least in the case of deduplication. Modern deduplication systems require very large caches in order to reduce the use of bloom filters on disk indices/hashes. As a result, the data reduction that is achieved on disk depends on, that is, is constrained by, the size of the memory used for storing the hashes of the data blocks. Data compression processes may likewise require large caches in order to retain sub-blocks until the compressed data fit in pre-defined sizes of compression units.

Thus, even if the data compression and data deduplication methods were to be combined somehow, the significant cache requirements of each would mean that there would likely still be a potential overall shortage of cache needed to serve those respective processes. Among other things, this cache shortage may cause reduced compression ratios, and/or may reduce the extent to which deduplication can be performed, thus resulting in duplicate blocks. That is, some duplicate blocks would have to be permitted in order to prevent loading the indices of the data block hashes from the backend storage. However, such a result would defeat the purpose of deduplication, and thereby hinder system performance.

Considerations such as these become increasingly significant due to the dramatic explosion in the size of the data sets used by modern applications from terabytes (TB) to petabytes (PB) to exabytes (EB). In order to prevent any data collisions, or simply collisions, for such large data sets, much larger cache memories are needed. It should be noted that as used herein, a data collision refers to data blocks that are different from each other, but have the same hash key. In such a case, one of the blocks could be deleted and replaced by another, thus creating data corruption at decoding time.

In view of considerations such as those outlined above, and elsewhere herein, embodiments of the invention embrace methods that will help to minimize the cache space utilization, while also maintaining the very high performance of SSD and NVMe devices using new, much more expensive media, one example of which is Intel's 3DXpoint.

For example, compression is applied to data blocks before a hash of the data block is computed. In this way, the amount of blocks written to disk is reduced, and fewer bits are needed to prevent collisions between blocks as the data set size will be smaller due to compression. This approach has some useful consequences. First, there is an ability to use a smaller hash size according to the compressed data set that can be more than 2× reduction in hash sizes without data collision, and without increasing the cache size. Second, the compression ratio for each block is used as an indication to retain the SHA hash in cache a relatively longer time for more compressible blocks than for relatively less compressible blocks. With these two effects, methods within the scope of the invention will allow better controllable balance between performance and data reduction percentage according to different data sets and workloads. As well, embodiments of the invention provide for on-the-fly allocation of cache to one or the other of a deduplication process or compression process, as needed. In this way, such embodiments provide for flexible and efficient use of cache capacity.

Operationally, embodiments within the scope of the invention receive application IOs in a compression cache, and then evaluate the blocks of the IO to determine an extent to which the blocks are compressible. Highly compressible blocks may be compressed and then retained in the compression cache for a time, while relatively less compressible blocks may be compressed and then flushed to disk storage. After the blocks are compressed, each block is hashed and the compression ratio for each data block is used as a basis to classify the data block hashes into one of several different groups according to the extent to which the data blocks are expected to be able to be deduplicated. Thus, it may be determined, for example, that the hashes for blocks which are only rarely able to be deduplicated may be safely flushed from a deduplication digest cache. On the other hand, hashes for blocks which are likely to be deduplicated may be retained in the deduplication digest cache for a time.

As indicated above, in at least some embodiments, the compression cache and deduplication digest cache are part of the same cache memory. Thus, for example, flushing of blocks from the cache memory to disk storage, may free up cache space that can then be used either by a compression process or by a deduplication process. In this way, cache space is employed by the compression process and deduplication process on an as-needed basis.

Advantageously then, embodiments of the invention enable an amount of data to be stored and, thus, the storage space needed for that data, to be reduced. As well, a fixed amount of cache memory can be effectively and efficiently utilized by employing the cache memory on an as-needed basis for one or the other of a deduplication process or a compression process. As another example, compression of the data prior to generating hashes enables a reduction in the size of the hashes and, correspondingly, a reduction in the amount of cache memory needed for a deduplication digest cache. Moreover, hashes can be classified in a hierarchical fashion according to an extent to which their associated data blocks are expected to be deduplicated and, in turn, the classification may be based upon a compression ratio of the block. As well, embodiments of the invention may eliminate the need for the use of bloom filters, and similar structures. Further, the flexibility in the use of the cache memory of a fixed size enables scaling of the available cache memory to meet the requirements of deduplication processes, that is, to be able to store enough hashes and associated indices to avoid data collisions and incomplete deduplication. As noted above, achievement of such results is further aided by compression of the data prior to hashing. As well, because the cache memory is more efficiently employed in embodiments of the invention, an improvement may be realized in the IOPs because there is no need to use bloom filters to obtain a hash index from storage.

As the foregoing examples illustrate, embodiments of the invention may improve the operation of a computing system, or element of a computing system, and/or may facilitate resolution of one or more technological problems relating to the allocation and use of cache memory in a method and system that employs both data compression and data deduplication.

A. Aspects of an Example Operating Environment

The following is a discussion of aspects of example operating environments for various embodiments of the invention. This discussion is not intended to limit the scope of the invention, or the applicability of the embodiments, in any way.

In general, embodiments of the invention may include and/or be implemented in an operating environment that includes a data protection environment, which may include one or more storage systems including primary storage and data protection storage. In some specific example embodiments of the invention, at least some data protection functionality may be provided by, or implemented in connection with, a platform such as the Dell-EMC DataDomain data protection platform, and associated systems, methods, and components, although use of this particular platform is provided only by way of illustration and is not required. More generally, embodiments of the invention may be employed in connection with various other data protection platforms, examples of which include, but are not limited to, any of the products in the Dell EMC DP Suite of data protection products.

The data protection environment may take the form of a cloud storage environment, an on-premises storage environment, and hybrid storage environments that include public and private elements, although the scope of the invention extends to any other type of data protection environment as well. Any of these example data protection environments, may be partly, or completely, virtualized.

In addition to the data protection environment, the operating environment may also include one or more host devices, such as clients for example, that each host one or more applications. As such, a particular client may employ, or otherwise be associated with, one or more instances of each of one or more applications. In general, the applications employed by the clients are not limited to any particular functionality or type of functionality. Some example applications and data include email applications such as MS Exchange, database applications such as SQL Server, filesystems, as well as datastores such as Oracle databases for example. The applications on the clients may generate new and/or modified data that is desired to be protected.

Any of the devices, including the clients, servers and hosts, in the operating environment can take the form of software, physical machines, or virtual machines (VM), or any combination of these, though no particular device implementation or configuration is required for any embodiment. Similarly, data storage system components such as databases, storage servers, storage volumes, storage disks, replication services, backup servers, restore servers, backup clients, and restore clients, for example, can likewise take the form of software, physical machines or virtual machines (VM), though no particular component implementation is required for any embodiment. Where VMs are employed, a hypervisor or other virtual machine monitor (VMM) can be employed to create and control the VMs.

As used herein, the term 'data' is intended to be broad in scope. Thus, that term embraces, by way of example and not limitation, data segments such as may be produced by data stream segmentation processes, data chunks, data blocks, atomic data, emails, objects of any type, files, contacts, directories, sub-directories, volumes, and any group of one or more of the foregoing. Data blocks may also be referred to herein simply as blocks.

Example embodiments of the invention are applicable to any system capable of storing and handling various types of objects, in analog, digital, or other form. Although terms such as document, file, block, or object may be used by way of example, the principles of the disclosure are not limited to any particular form of representing and storing data or other information. Rather, such principles are equally applicable to any object capable of representing information.

Figure 1:
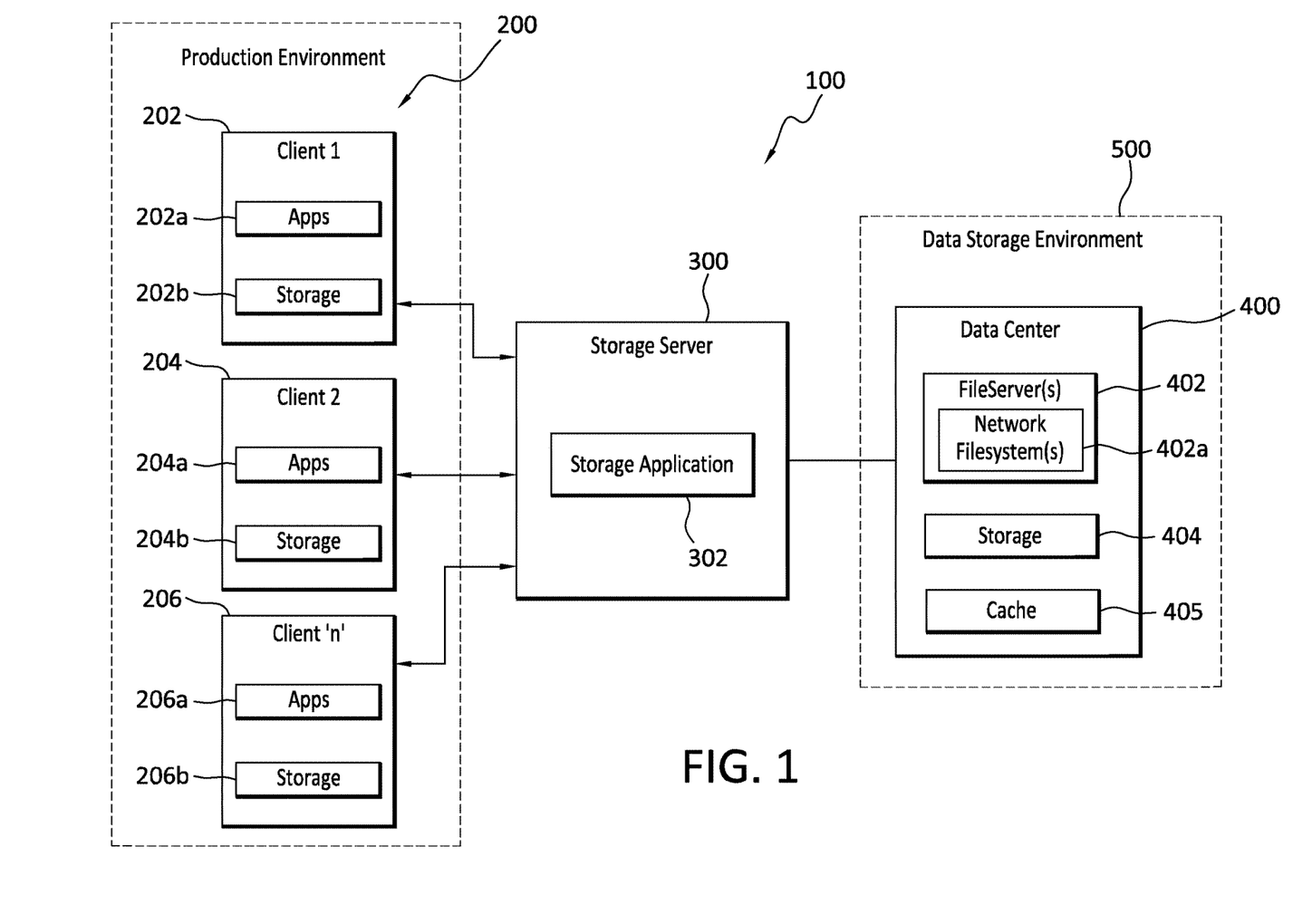
FIG. 1 discloses aspects of an example operating environment for some embodiments of the invention.

With particular reference now to FIG. 1, an example operating environment 100 may include a plurality of clients 200, such as clients 202, 204 and 206. Each of the clients 200 may host one or more applications 202a, 204a and 206a, respectively, that create new and/or modified data that is desired to be protected, and the applications 202a, 204a and 206a may send and receive IOs to/from cache memory, such as the cache 405 located at datacenter 400, discussed below. The cache 405 may include, or be controlled by, a processor and executable instructions, such as an algorithm, that controls the handling of application IOs and also controls management of the cache 405.

Continuing, the clients 200 are examples of host devices. One, some, or all, of the clients 200 may take the form of a VM, although that is not required. In general, the VM is a virtualization of underlying hardware and/or software and, as such, one or more of the clients 200 may include or otherwise be associated with various underlying components.

As well, each of the clients 200 may include respective local storage 202b, 204b and 206b. The local storage 202b, 204b and 206b can be used to store data, which may be stored in, and/or retrieved from, the data storage 500 environment as disclosed herein. The data can be restored to local storage 202b, 204b and 206b.

With continued reference to FIG. 1, the example operating environment 100 may further include one or more storage servers, such as a storage server 300, which may include a storage application 302. The storage server 300, such as by way of the storage application 302, may cooperate with one or more of the clients 202, 204 and 206 to store data to, and retrieve data from, the data storage environment 500.

The data storage environment 500 may support various processes, including data replication, data deduplication, cloning, data backup, storage, and data restoration, for example. As indicated, the data storage environment 500, may comprise or consist of datacenter 400, which may be a cloud storage datacenter in some embodiments, that includes one or more network fileservers 402 that are accessible, either directly or indirectly, by the clients 200. Each of the network fileservers 402 can include one or more corresponding network filesystems 402a, and/or portions thereof.

The datacenter 400 may include and/or have access to storage 404, such as a data storage array for example, that communicates with the network filesystems 402a. In general, the storage 404 is configured to store client 200 data backups that can be restored to the clients 200 in the event that a loss of data or other problem occurs with respect to the clients 200. The term data backups is intended to be construed broadly and includes, but is not limited to, partial backups, incremental backups, full backups, clones, snapshots, continuous replication, and any other type of copies of data, and any combination of the foregoing. Any of the foregoing may, or may not, be deduplicated.

The storage 404 can employ, or be backed by, a mix of storage types, such as Solid State Drive (SSD) storage for transactional type workloads such as databases and boot volumes whose performance is typically considered in terms of the number of input/output operations (IOPS) performed. Additionally, or alternatively, the storage 404 can use Hard Disk Drive (HDD) storage for throughput intensive workloads that are typically measured in terms of data transfer rates such as MB/s.

Finally, the datacenter 400 may include cache memory 405 that may be of any size and type. For example, the cache memory 405 may comprise, or consist of, SSD and/or NVMe devices, although no particular type of cache memory is necessarily required. Among other things, the cache memory 405 may communicate, in the form of IOs, with applications 202a, 204a and/or 206a. As discussed in more detail elsewhere herein, the cache memory 405 may include a compression cache and a deduplication, or 'dedup,' digest cache.

B. Aspects of an Example Configuration and Use of Cache Memory

Figure 2:
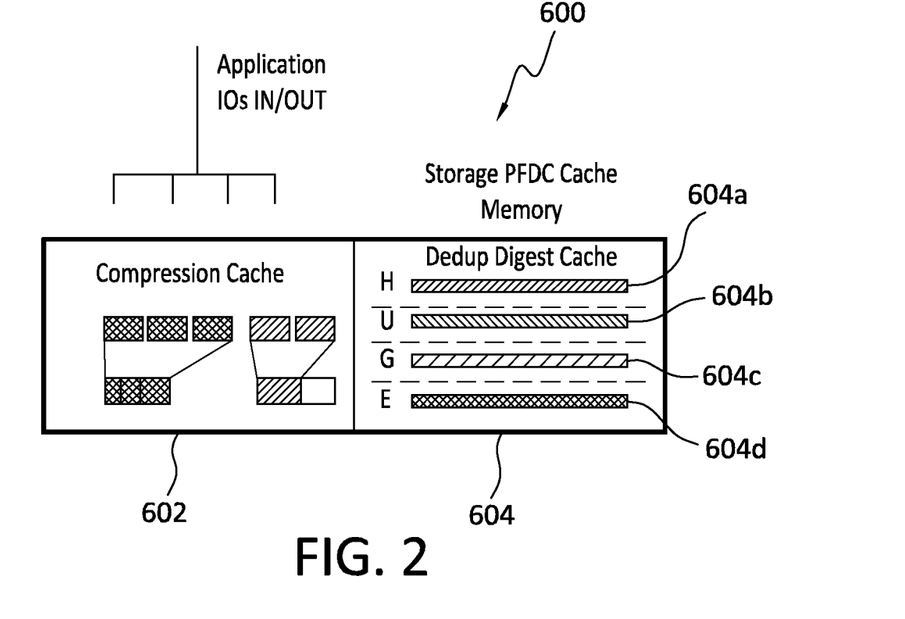
FIGS. 2 and 3 disclose aspects of example cache memory and associated IO operations.
Figure 3:
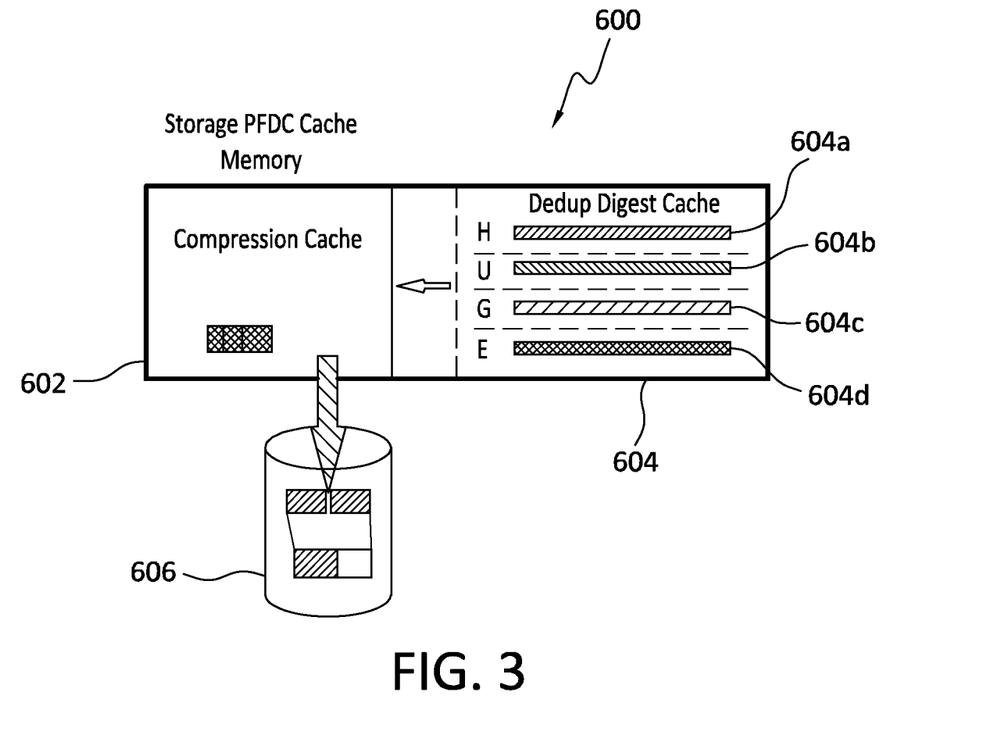

Directing attention now to FIGS. 2 and 3, further details are provided concerning the configuration and use of cache memory according to some example embodiments. As shown, a cache memory 600, such as a Persistent File Data Cache (PFDC) for example, is provided that may comprise, or consist of, the cache memory 405 shown in FIG. 1. The cache memory 405 may be considered to have at least two different portions, which may or may not be defined by a partition in the cache memory 405. The first portion may be a compression cache 602, and the second portion may be a dedup digest (DD) cache 604. In general, the compression cache 602 receives/sends IOs that each identify one or more data blocks to be read or written. As noted elsewhere herein, the IOs may be associated with one or more applications, but that is not necessarily required and, more generally, the IOs can be any type that involve the use of the cache memory 600. In at least some embodiments, all of the IOs are initially directed to/from the compression cache 602 rather than to/from the DD cache 604.

A relationship between the compression cache 602 and the DD cache 604 may be such that as memory becomes available in the compression cache 602, that memory may be available for use in connection with deduplication processes that involve the DD cache 604. The reverse may likewise, or alternatively, be true, that is, as memory becomes available in the DD cache 604, that memory may be available for use in connection with compression processes that involve the compression cache 602.

In general, the compression cache 602 may store both compressed and uncompressed blocks. The DD cache 604 stores hashes of the compressed blocks. Thus, as the foregoing suggests, the hashes are not created until after the blocks are compressed. In this way, the hashes take up relatively less space in the DD cache 604 than if they were created prior to compression.

As further indicated in FIGS. 2 and 3, the DD cache 604 may be organized in groups of blocks, where each block corresponds generally to a particular likelihood that a given compressed block will be deduplicated. Thus, in the example illustrated embodiment, the DD cache 604 includes 4 groups for blocks that ranges from blocks that can rarely be deduplicated to blocks that can usually be deduplicated: Horrible (H) 604a, Unknown (U) 604b, Good (G) 604c and Excellent (E) 604d. It will be appreciated that more, or fewer, groups could be employed. As well, the groups need not have any particular names, and could alternatively be assigned numbers rather than names. It should be noted that while it is the data blocks that are classified with this scheme, the data blocks themselves are not stored in the DD cache 604. Rather, and as noted earlier, only the hashes of the data blocks are stored in the DD cache 604.

The blocks are classified as being associated with a particular group H, U, G, or E, by the respective compression ratio of the block. Consequently, there is typically no need to move the blocks between the groups as the blocks can be associated with the correct group at the outset. Classification can be performed by using the compression levels of the blocks in at least two ways.

First, an average compression ratio of each block is determined, for example, by calculating the average of the compression ratio of each 8 KB block that is included in a compressed 8 KB block, and then using the calculated compression ratio as a basis for determining in what cache group, that is, H, U, G, or E, to put the index Secure Hash Algorithm (SHA) key according to the compression average. It should be noted that as used herein, the compression ratio is simply the uncompressed size of the block, divided by the compressed size of the block.

In general, the greater the compression ratio for a given block, the longer the SHA key, or hash, of that block will be retained in DD cache 604 inside the corresponding dedupe group, that is, one of groups H, U, G, or E. This is because relatively less compressible blocks will fill up the compression cache 602 faster 12×8 KB and will be flushed to disk 606 as they will be more quickly completed while, on the other hand, there is a higher probability that relatively more compressible blocks can be compressed further and may thus be retained in the compression cache 602 relatively longer than the less compressible blocks. It should be noted that the 12×8 KB blocks may be compressed significantly more than the other blocks, and it is thus possible, for example, that 12 blocks will be reduced to 32768 bytes instead of 96 KB. Thus, these blocks should be kept longer in the compression cache 602 to wait for such compressible blocks to be written to the disk storage 606 by the application. In at least some embodiments, 12 blocks units are written to the disk 606, but no less, so that the less compressible blocks live for a shorter time in the compression cache 602.

In more detail, when a block is compressed but not yet flushed to disk 606, as shown in FIG. 2, that block occupies cache 600 space that could be used instead for the DD cache 604. The compressed blocks are kept in the compression cache 602 until, for example, a group of 12 blocks are written to disk 606 as shown in the example of FIG. 3. As such, these blocks are using compression cache 602 while waiting to compress an entire block, that is 12×8 KB blocks filled in the compression cache 602 and ready to be flushed to disk 606 and free the cache occupied blocks. These blocks are the shaded ones on the left side of FIG. 2 that only fill half of the 12 blocks. It should be noted that in this particular context, a block refers to 12×8 KB, but larger, or smaller, sizes of blocks can alternatively be used.

As indicated in FIG. 3, the relatively less compressible blocks, such as the 'H' category blocks may be flushed to disk 606 relatively more quickly than the relatively less compressible 'E' category blocks. Similarly, the hashes respectively associated with the 'H' category blocks may be flushed from the DD cache 604 relatively more quickly than the hashes associated with the 'E' category blocks.

In the preceding discussion it was noted that classification of blocks in one of the example categories shown in FIGS. 2 and 3 can be performed by using the compression levels of the blocks in at least two ways, one of which concerns a compression ratio of the blocks. The second way involves measurement of the time it takes for all the compressed blocks to be retained in the cache 600 before the blocks are flushed to the disk 606 and, based on that, a decision is made as to which queue to put the SHA index inside the example dedupe groups 'H,' 'U,' 'G' or 'E.' This approach provides visibility into whether the blocks written to a given volume are frequently written and, if so, the blocks that take longer to flush to disk 606 will be moved to a less frequently used dedupe group, since the compressed block is kept relatively longer in the compression cache 602 of the cache 600, thus using more memory and leaving less space for the SHA indices in DD cache 604. The relatively smaller amount of space for SHA indices, in turn, results in removal of a hash relatively sooner from the DD cache 604 and, in this way, more space in the cache 600 memory is left available for the uncompleted compressed blocks.

As is apparent, this approach will allow the balanced utilization of the cache 600 for best DRR (data reduction rate). Using this algorithm will allow balance of performance and DRR ratios with minimal CPU usage and will not require additional cache for the data reduction. As a result, blocks that are less compressible will stay a relatively shorter time in the compression cache 602 before being flushed to disk 606 and will thereby reduce the memory footprint for the compression processes and allow more memory to be used for caching the SHA hashes, thus enabling broader and faster deduplication on blocks that are less compressible but relatively "popular," that is, relatively frequently accessed.

Thus, embodiments of the invention may avoid the need to effect the tradeoffs between DRR and IOPs that would otherwise be needed in order to preserve overall performance, and may also avoid the need to use garbage collection off line in an effort to keep DRR high and cache space economy under control. As well, embodiments of the invention may avoid the need to effect the tradeoffs between retaining the blocks long enough in the cache to fill entire blocks, and using only partial blocks, thus leaving disk space unused and requiring the use of tools to recover the lost disk space off line. Thus, embodiments of the invention may balance the deduplication and compression ratios by reducing the amount of garbage and not requiring access to disk more often than needed, while keeping the IOPS and latency optimal with very small additional compute resources.

C. Example Host and Server Configurations

Figure 4:
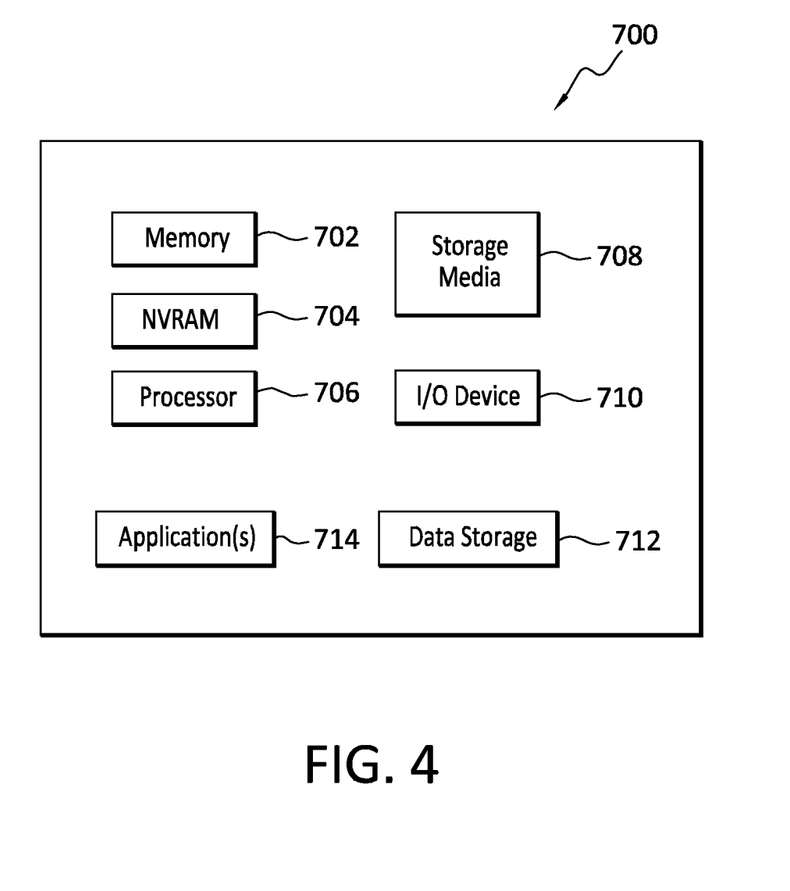
FIG. 4 discloses aspects of an example host configuration.

With reference briefly now to FIG. 4, any one or more of the clients 200 and its components, backup server 300, data center 400 and its components, cache 405, data storage environment 500 and its components, and cache 600 can take the form of a physical computing device, one example of which is denoted at 700. As well, where any of the aforementioned elements comprise or consist of a VM, that VM may constitute a virtualization of any combination of the physical components disclosed in FIG. 4.

In the example of FIG. 4, the physical computing device 700 includes a memory 702 which can include one, some, or all, of random access memory (RAM), non-volatile random access memory (NVRAM) 704 which may additionally or alternatively take the form of NVMe flash backend devices, read-only memory (ROM), and persistent memory, one or more hardware processors 706, non-transitory storage media 708, I/O device 710, and data storage 712. One or more of the memory components 702 of the physical computing device can take the form of solid state device (SSD) storage. As well, one or more applications 714 are provided that comprise executable instructions. Such executable instructions can take various forms including, for example, methods and algorithms that control the handling of application IOs by a cache, and also controls management of that cache.

D. Aspects of Some Example Methods

Figure 5:
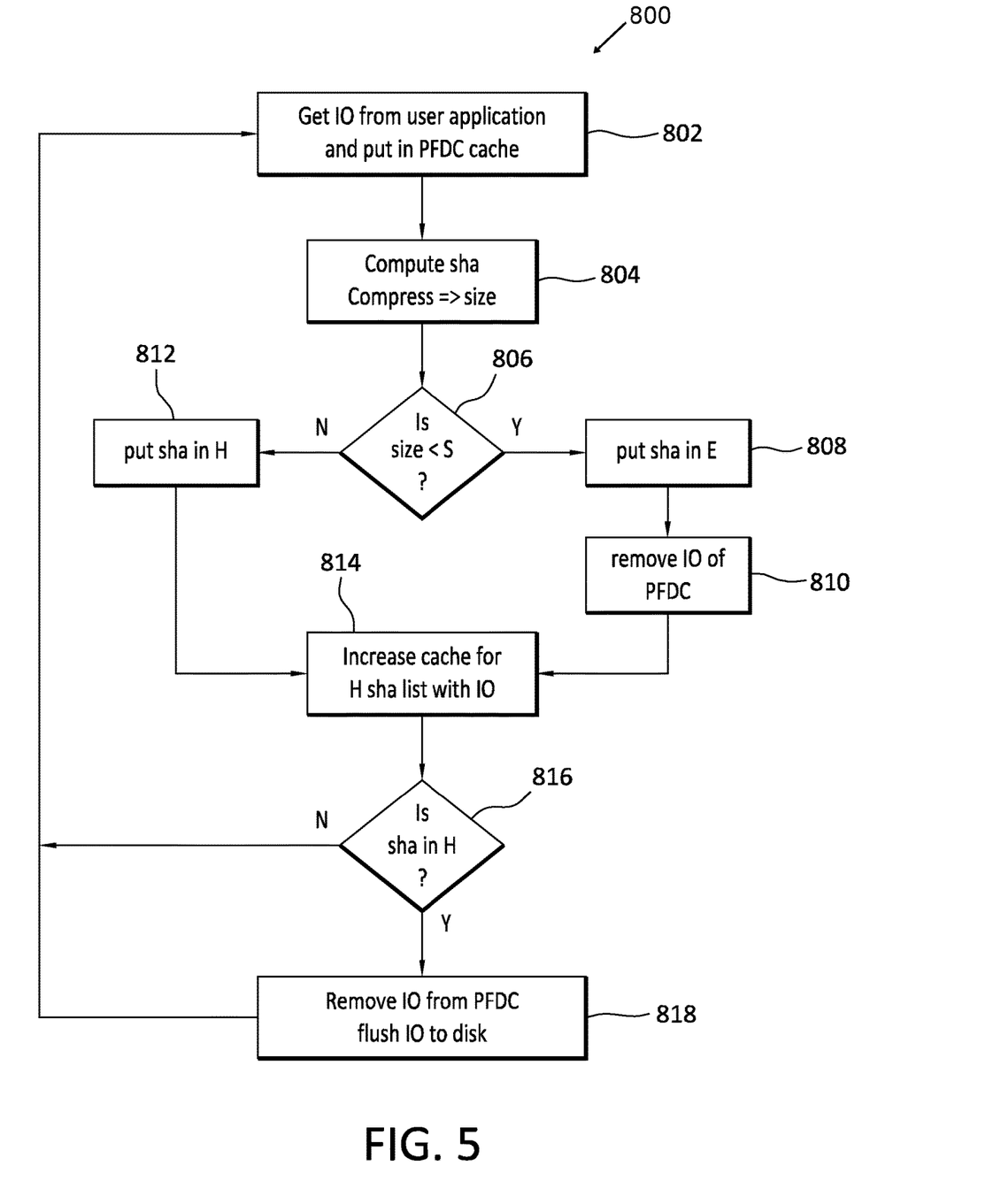
FIG. 5 discloses aspects of some example methods.

With reference now to FIG. 5, details are provided concerning methods for managing a cache. Such methods may be referred to as cache adaptive management methods. The methods may be implemented within a cache memory, or the cache memory may be externally controlled to perform part or all of the method. In general, embodiments of the methods may provide for effective and efficient cache utilization for both data compression and data deduplication processes involving the cache. More particularly, example embodiments of the methods may, among other things, provide for minimizing the demands placed on the cache by compression and deduplication processes so that those processes can be performed relatively quickly and efficiently. This may be accomplished by reducing the amount of cache needed to store both compressed and uncompressed blocks, as well as by reducing the amount of cache needed to store hashes of the blocks.

With particular reference now to FIG. 5, one example method is denoted generally at 800. The method 800 may begin when an IO is received 802 at a cache memory from a user application. The IO could be, for example, a read request or a write request, although no particular IO, or type of IO, is required. In some embodiments, the process 802 may additionally, or alternatively, comprise an IO transmitted from the cache memory to a user application. In either case, the IO is placed in the cache, which may comprise a PDFC cache, although no particular type of cache is required.

After the IO is cached 802, the block, or blocks, identified in the IO are compressed 804, and the compressed blocks are then hashed 802 to produce respective hashes that correspond to each of the compressed blocks. Next, the respective compression ratio of each block is examined to determine 806 the particular group of the DD cache with which the hash of the block is associated. For example, if the compression ratio is less than a particular value 'S,' the hash of that block will be placed in a DD cache group 808, such as the example 'E' group disclosed herein. That is, if the compressed block size is less than the threshold size, that means the block is compressed more than S. To illustrate with an example, if S=8100, the block is compressible and the hash will be put in the E group. As noted earlier, blocks associated with the 'E' group may be blocks that are considered to be amenable to further compression, and which are relatively more likely to be deduplicated. Because these blocks may be amenable to further compression, they may be retained for additional time in the compression cache. In the event that the hash is placed in the 'E' group, the IO with which the blocks are associated can then be removed 810 from the cache.

On the other hand, if the compression ratio is greater than a particular value 'S,' that means that the block is relatively less compressible and, as such, the hash of that block will be placed in a DD cache group 812, such as the example 'H' group disclosed herein. As noted earlier, blocks associated with the 'H' group may be blocks that are considered to be unable to be further compressed, or at least not significantly compressed, and which are relatively less likely to be deduplicated. Because these blocks may not be amenable to further compression, they may be flushed from the compression cache to disk. Thus, in at least some embodiments, if the hash of a block is in the 'H' group, the corresponding IO of that block will be removed from the cache since it is unlikely that significant disk space will be obtained by further block compression, for example if the maximum size is 8192 and 'S' is 8100. This approach reflects a policy that cache space generally will not be allocated to a block that is uncompressible, or nearly so.

With continued reference to FIG. 5, regardless of whether a block was placed in the 'H' group 808 or the 'E' group 812 of the DD cache, the cache space is increased 814 for the 'H' hash group, or list, with IO. In 814, if the 8K IO block is removed from the compression cache, the amount of cache released by that removal is transferred to the 'H' hash group.

Next, a determination is made 816 as to whether or not the hash of the data block is in the 'H' group. If the hash is in the 'H' group, the corresponding IO will be removed from the compression cache and that IO then flushed to disk 818. On the other hand, if the hash is not in the 'H' group, the process 800 may return to 802.

E. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware storage such as Solid State Disk/Device (SSD), RAM, ROM, EEPROM, CD-ROM, flash memory, Phase-Change Memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or other machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
   storing a user application input/output operation (IO) in a compression cache portion of a cache memory wherein the user application IO is associated with a data block;
   compressing the data block to produce a compressed data block;
   hashing the compressed data block to create a hash that uniquely corresponds to the compressed data block;
   storing the hash in a deduplication digest portion of the cache memory and the deduplication digest portion includes first and second groups, each of which corresponds to a particular extent to which a data block is compressible, where the first group includes hashes that correspond to data blocks that are each relatively less compressible than data blocks whose respective hashes are included in the second group, and each of the groups corresponds to a particular extent to which a data block is able to be deduplicated, and;
   retaining the compressed data block in the compression cache portion when a compressibility of the compressed data block exceeds a threshold; and
   flushing the compressed data block from the compression cache portion to disk when the compressibility of the compressed data block does not exceed the threshold.

2. The method as recited in claim 1, wherein the user application IO is one of a read request, or a write request.

3. The method as recited in claim 1, wherein a hash in the first group is flushed from the deduplication digest portion of the cache memory relatively more quickly than a hash in the second group.

4. The method as recited in claim 3, wherein a data block whose hash is included in the first group is retained in the compression cache portion a relatively shorter time than a data block whose hash is included in the second group.

5. The method as recited in claim 1, wherein when the compressed data block is flushed from the compression cache portion to disk, the relative amount of space in the cache memory that is available for storage of hashes increases.

6. The method as recited in claim 1, further comprising removing the client application IO from the cache memory, and flushing the client application IO to disk.

7. The method as recited in claim 1, wherein the cache memory comprises one or both of: Solid State Drive (SSD) storage media; and, nonvolatile memory flash backend devices.

8. The method as recited in claim 1, further comprising performing a data deduplication process with respect to one or more data blocks whose hashes are stored in the deduplication digest portion of the cache memory.

9. The method as recited in claim 1, wherein when the hash is removed from the deduplication digest portion of the cache memory, the relative amount of space in the cache memory that is available for storage of compressed blocks increases.

10. The method as recited in claim 1, wherein a data block is retained in the compression cache portion until a group of 'n' data blocks are written to disk, wherein the group of 'n' data blocks includes the data block.

11. A non-transitory storage medium having stored therein instructions which are executable by one or more hardware processors to perform operations comprising:
    storing a user application input/output operation (IO) in a compression cache portion of a cache memory wherein the user application IO is associated with a data block;
    compressing the data block to produce a compressed data block;
    hashing the compressed data block to create a hash that uniquely corresponds to the compressed data block;
    storing the hash in a deduplication digest portion of the cache memory and the deduplication digest portion includes first and second groups, each of which corresponds to a particular extent to which a data block is compressible, where the first group includes hashes that correspond to data blocks that are each relatively less compressible than data blocks whose respective hashes are included in the second group, and each of the groups corresponds to a particular extent to which a data block is able to be deduplicated, and;
    retaining the compressed data block in the compression cache portion when a compressibility of the compressed data block exceeds a threshold; and
    flushing the compressed data block from the compression cache portion to disk when the compressibility of the compressed data block does not exceed the threshold.

12. The non-transitory storage medium as recited in claim 11, wherein the user application IO is one of a read request, or a write request.

13. The non-transitory storage medium as recited in claim 11, wherein a hash in the first group is flushed from the deduplication digest portion of the cache memory relatively more quickly than a hash in the second group.

14. The non-transitory storage medium as recited in claim 13, wherein a data block whose hash is included in the first group is retained in the compression cache portion a relatively shorter time than a data block whose hash is included in the second group.

15. The non-transitory storage medium as recited in claim 11, wherein when the compressed data block is flushed from the compression cache portion to disk, the relative amount of space in the cache memory that is available for storage of hashes increases.

16. The non-transitory storage medium as recited in claim 11, wherein the operations further comprise removing the client application IO from the cache memory, and flushing the client application IO to disk.

17. The non-transitory storage medium as recited in claim 11, wherein the cache memory comprises one or both of: solid state drive (SSD) storage media; and, nonvolatile memory flash backend devices.

18. The non-transitory storage medium as recited in claim 11, wherein the operations further comprise performing a data deduplication process with respect to one or more data blocks whose hashes are stored in the deduplication digest portion of the cache memory.

19. The non-transitory storage medium as recited in claim 11, wherein when the hash is removed from the deduplication digest portion of the cache memory, the relative amount of space in the cache memory that is available for storage of compressed blocks increases.

20. The non-transitory storage medium as recited in claim 11, wherein a data block is retained in the compression cache portion until a group of 'n' data blocks are written to disk, wherein the group of 'n' data blocks includes the data block.

* * * * *